United States Patent [19]

Sampo

[11] Patent Number: 4,992,031
[45] Date of Patent: Feb. 12, 1991

[54] INTERNAL COMBUSTION ENGINE DRIVEN MULTIPLE PUMP

[75] Inventor: Matti Sampo, Turenki, Finland

[73] Assignee: Toiminimi Kone-Sampo, Turenki, Finland

[21] Appl. No.: 456,151

[22] Filed: Dec. 11, 1989

Related U.S. Application Data

[63] Continuation-in-part of Ser. No. 160,006, Feb. 24, 1988, abandoned.

[30] Foreign Application Priority Data

Feb. 25, 1987 [FI] Finland .................................. 870801

[51] Int. Cl.⁵ .............................................. F01B 17/00
[52] U.S. Cl. ...................................... 417/364; 417/287
[58] Field of Search ............... 417/364, 380, 396, 340, 417/3, 4, 5, 287

[56] References Cited

U.S. PATENT DOCUMENTS

| | | | |
|---|---|---|---|
| 1,741,731 | 12/1929 | Nordensson | 417/364 |
| 2,739,671 | 3/1956 | Edge et al. | 417/396 |
| 3,089,305 | 5/1963 | Hobbs | 417/364 |
| 3,286,636 | 11/1966 | Schaub | 417/287 |
| 3,606,591 | 9/1971 | Potma | 417/364 |
| 4,097,198 | 6/1978 | Herron | 417/380 |

FOREIGN PATENT DOCUMENTS

| | | | |
|---|---|---|---|
| 48697 | 3/1982 | European Pat. Off. | 417/364 |
| 2538043 | 6/1984 | France | 417/364 |
| 57405 | 12/1936 | Norway | 417/380 |
| 561536 | 5/1944 | United Kingdom | 417/364 |

Primary Examiner—Leonard E. Smith
Attorney, Agent, or Firm—Mason, Fenwick & Lawrence

[57] ABSTRACT

A power aggregate comprising a two-stroke engine, a piston rigidly linked together by means of a piston rod, a plurality of pump cylinders circumferentially mounted around the piston rod and a corresponding number of pump pistons fixed to the piston rod through the intermediary of radial rods or a flange, for reciprocation within the pump cylinders. Each pump cylinder is provided with hydraulic fluid intake and pressure ducts, and at least two of the pump cylinders have different diameters. The hydraulic duct of one or several pump cylinders operates its own hydraulic motor or actuator cylinder.

7 Claims, 4 Drawing Sheets

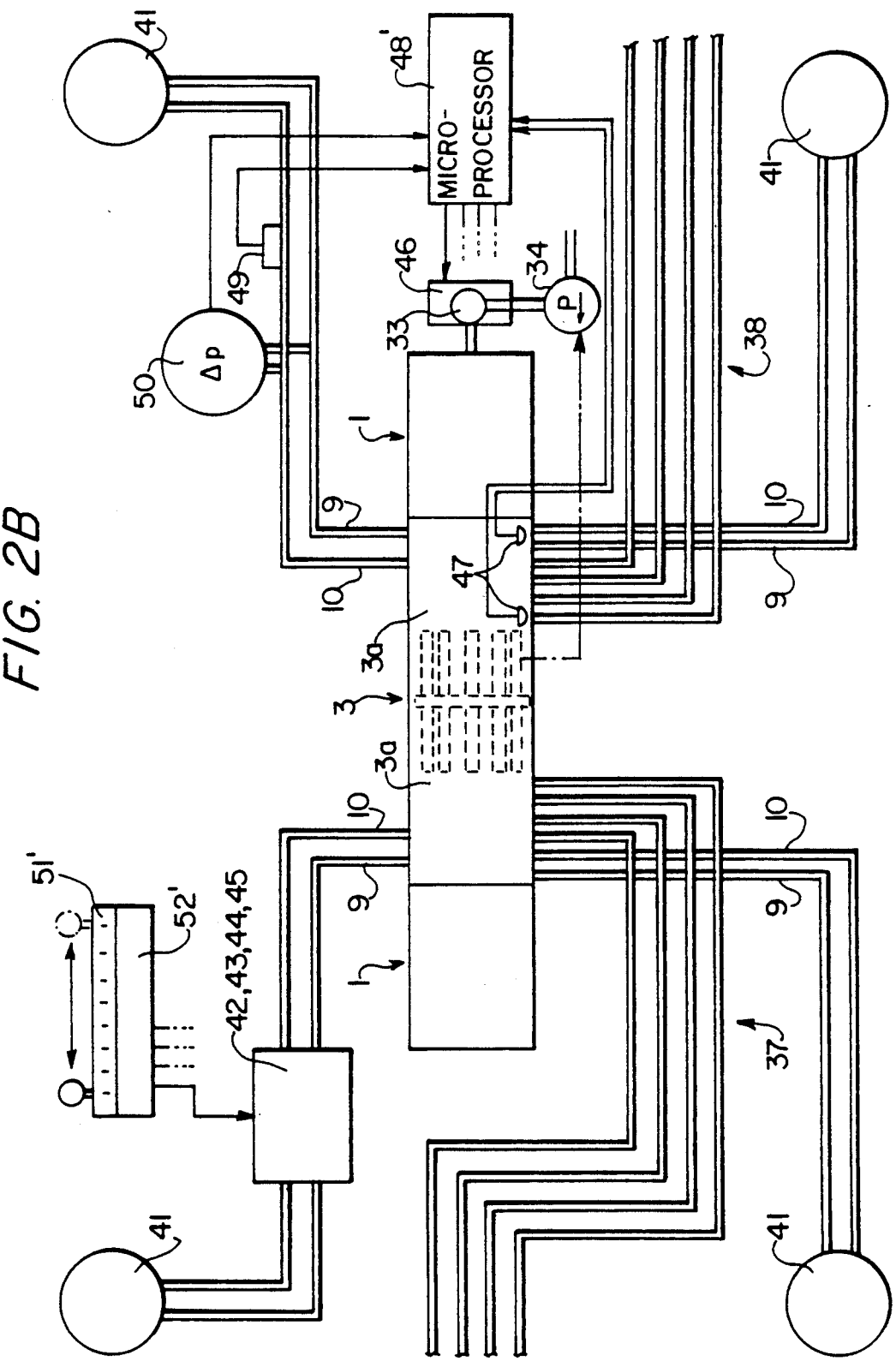

4,992,031

INTERNAL COMBUSTION ENGINE DRIVEN MULTIPLE PUMP

PRIOR RELATED APPLICATION

This application is a continuation-in-part of my prior application Ser. No. 160,006, filed Feb. 24, 1988, now abandoned.

BACKGROUND OF THE INVENTION

The present invention relates to a power aggregate, comprising:
a body,
an internal combustion engine with at least one engine cylinder mounted on the body,
a reciprocating engine piston in the engine cylinder,
a piston rod fastened to the engine piston to be reciprocated therewith, and
a pump output unit, comprising a pump cylinder and a pump piston which is fixed to the piston rod.

This type of power aggregate is disclosed in U.S. Pat. No. 3,089,305. This type of power aggregate offers a plurality of advantages over the available power aggregates in which the pump and the engine are independent units and a rotating engine crankshaft must be connected through the intermediary of a rotating power output shaft to a rotating pump transmission shaft.

Such advantages include:
an essentially simpler and more compact design since rotating components are eliminated and the engine and the pump provide structurally and functionally a single unit,
avoiding the problems involved in linking together an engine and a separate pump, and
the engine power contributes more effectively than before directly to the pressurization of hydraulic fluid.

Despite these essential advantages, however, the above type of power aggregate has not advanced beyond a testing stage. One important reason for this seems to be that there is no successful solution to power output and distribution to service points. If a piston rod is provided with just one concentric hydraulic cylinder, a problem will be how to control its output within sufficiently wide limits and how to distribute it to different service points with mutually independent power demands.

SUMMARY OF THE INVENTION

A general object of the invention is to further develop the above type of power aggregate for making the operation of its engine pistons as effective as possible and for converting it directly into the power aggregate output which is qualitatively and quantitatively adaptable to the mutually independent demands of different applications.

A particular object of the invention is to provide a power aggregate whose hydraulic power can be distributed in a simple fashion to different drive motors and working tools, so that the operation of each motor and working tool can be readily and independently regulated.

A further object of the invention is to provide an effective and, in view of its output, a compact power aggregate, whereby the operating energy (hydraulic, electric or pneumatic) for the driving motors and working tools of a working machine can be produced as directly as possible in a desired form.

In order to achieve these purposes, a power aggregate of the invention comprises a body, an internal combustion engine having at least one engine cylinder mounted on the body, a reciprocating engine piston in the engine cylinder, a piston rod fastened to the engine piston, whereby the piston rod reciprocates in association with the engine piston, and a power output unit comprising a plurality of pump cylinders and a plurality of pump pistons fixed to the piston rod at a radial distance from the piston rod, each of the pump cylinders having a corresponding pump piston reciprocating therein and each of the pump cylinders and its corresponding pump piston forming a unit. Each of the pump cylinders has a hydraulic fluid intake duct and a pressure duct, the intake ducts and the pressure ducts connecting the pump cylinders to a drive motor or an actuator cylinder.

In one aspect of the invention, at least two of the pump cylinders have different diameters and are connected to a single drive motor or actuator cylinder, and the pressure ducts of the pump cylinders each have a control valve for separately controlling the outputs of the pump cylinders.

In another aspect of the invention, at least two units of the pump pistons and the pump cylinders are connected in direct liquid communication with a single drive motor or a single actuator cylinder, and each of the at least two piston-cylinder units has a valve for allowing free circulation of the hydraulic fluid.

DESCRIPTION OF THE DRAWINGS

Alternate embodiments of the invention will now be described with reference made to the accompanying drawings, in which:

FIG. 2B is a diagrammatic view of a second embodiment of an application of the power aggregate of FIG. 1;

DESCRIPTION OF A PREFERRED EMBODIMENT

Figure 1:
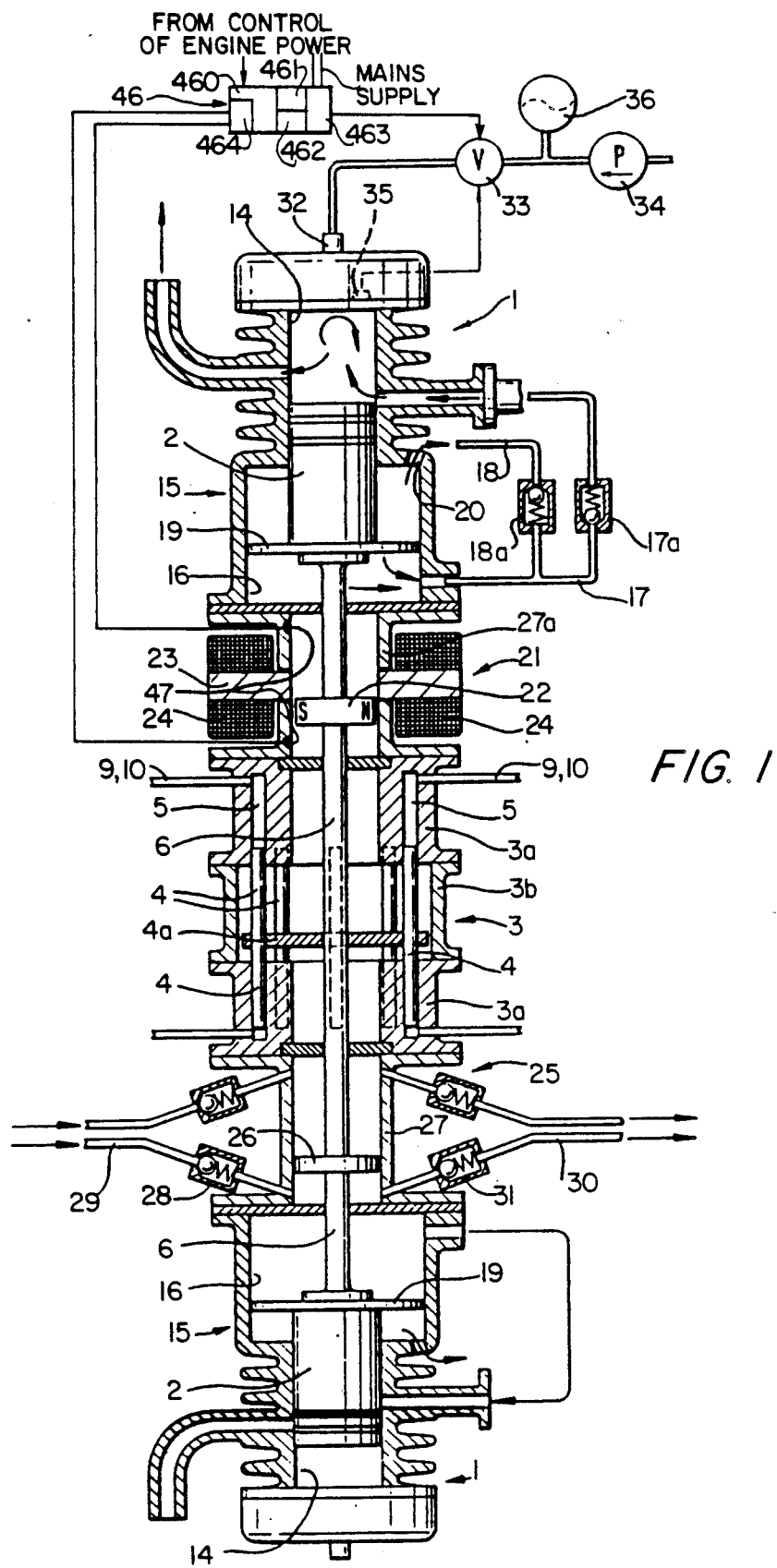
FIG. 1 is an axial longitudinal section of the power aggregate of the invention.

The engine section 1 of a power aggregate includes two coaxial engine cylinders 14 whose engine pistons 2 are rigidly linked together by means of a rod 6, serving as a common piston rod for pistons 2. The body of a power aggregate comprises piston rod 6 surrounding annular members 27, 3a, 3b, 27a, which are mounted axially one after the other. Between engine cylinders 14 and body members 27, 27a is a compressor 15, comprising a compressor cylinder 16 and a compressor piston 19 fixed to the base of piston 2. The compressor further includes an intake air duct 18 fitted with a back-pressure valve 18a and a scavenging air duct 17 connecting compressor cylinder 16 to engine cylinder 14. A back-pressure valve 17a in duct 17 is not necessary for operating the device. The end of compressor cylinder 16 facing the engine is provided with a breather port 20 opening to atmosphere.

A hydraulic pump section is generally designated with reference numeral 3 and includes axially-spaced ring members 3a and a ring member 3b therebetween. Each ring member 3a is provided with a plurality of axially directed hydraulic pump cylinders 5, spaced at suitable distances over the circumference of ring member 3a. The rod-like pistons 4 in cylinders 5 are fixed to a flange 4a carried by ring member 3b and fastened to piston rod 6. Flange 4a can of course be replaced by radial rods in a known manner. Each pump cylinder 5 is provided with a hydraulic fluid delivery duct or pressure conduit 9 and intake duct or return conduit 10. Delivery and intake ducts 9 and 10 are respectively provided with conventional back or one-way valves 9a and 10a in fluid communication with cylinders 5, in order to ensure that delivery and intake ducts 9 and 10 operate as separate, rather than combined, lines.

The number of hydraulic pump cylinders 5 depends on a particular application. The minimum number is two (2) pump cylinders 5 in one stroke direction. A single double-piston engine can also include three (3) pump cylinders 5, two smaller ones being directed in one direction and the larger one in the opposite direction. As a kind of rating, it could be said that in most practical applications the number of cylinders 5 should be at least six (6). Generally, the demand is no more than thirty (30). The power aggregates can be constructed with various numbers of cylinders simply by manufacturing the components 3a, 3b, 4a, and 4 so as to correspond to the required number and size of cylinders 5. This requirement is determined on the basis of the number and size of hydraulic motors and actuator cylinders in a working machine. It is often preferable to provide two or more piston-cylinder units 4, 5 to operate a single drive motor or actuator cylinder, the driving or running speed being adjustable by switching one or more piston-cylinder units 4, 5 for operation and the rest for free circulation of the hydraulic liquid.

In one aspect of the invention, the hydraulic pump section is provided with at least three pump cylinders 5 and corresponding pump pistons 4, and at least one of the piston-cylinder units 4, 5 has a different diameter than the others. The pump cylinders 5 having different diameters are connected to a single drive motor 41 or actuator cylinder, whereby the piston-cylinder units 4, 5 drive the drive motor 41 or the actuator cylinder. This aspect of the invention is shown in FIG. 3 with three piston-cylinder units 4, 5 all of different diameters connected to a single drive motor 41.

Figure 3:
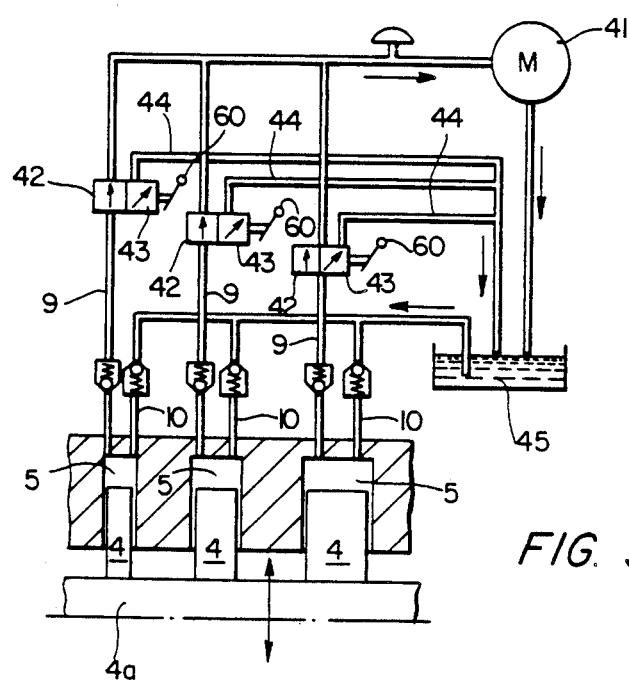
FIG. 3 is a diagrammatic view of an enlarged section of the hydraulic pump section of the power aggregate in an application to a drive motor.
Figure 4:
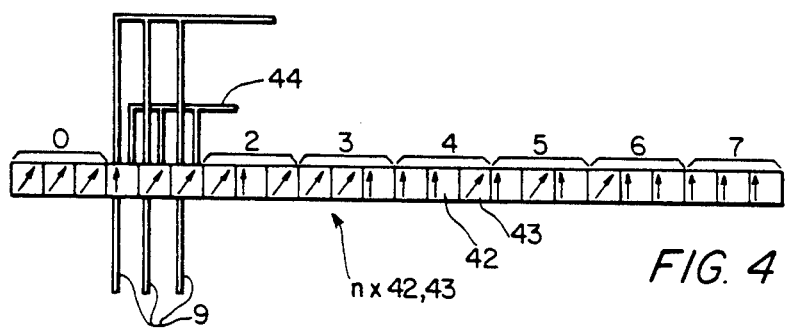
FIG. 4 is a diagrammatic view showing the separate output control valves combined in a single valve body, for use in the power aggregate of FIG. 1.

As previously described, each of the pump cylinders 5 shown in FIG. 3 has a hydraulic fluid intake duct 10 and a pressure or delivery duct 9, which connect each of pump cylinders 5 to drive motor 41 or an actuator cylinder. Each of the pressure or delivery ducts 9 has its own output control valve 42 for separately controlling the outputs of the pump cylinders 5. Each of the delivery ducts 9 also has a circulation valve 43 therein connected to a circulation duct 44 which is fluid connected with the hydraulic fluid 45. The circulation valves 43 can be opened or closed to selectively switch one or more of piston-cylinder units 4, 5 for operation and the rest for free circulation of hydraulic fluid 45, to adjust the driving or running speed of drive motor 41 or an actuator cylinder.

The valves 42 and 43 can be combined in one valve body such that the different positions (0 to 7) of the valve body cover all possible combinations of the activated pump cylinders 5 (through valves 42) and non-activated pump cylinders 5 (through valves 43). However, with several cylinders 5, this kind of structure in which the separate valves 42 and 43 are combined in one valve body is clumsy, expensive, and impractical.

Figure 2A:
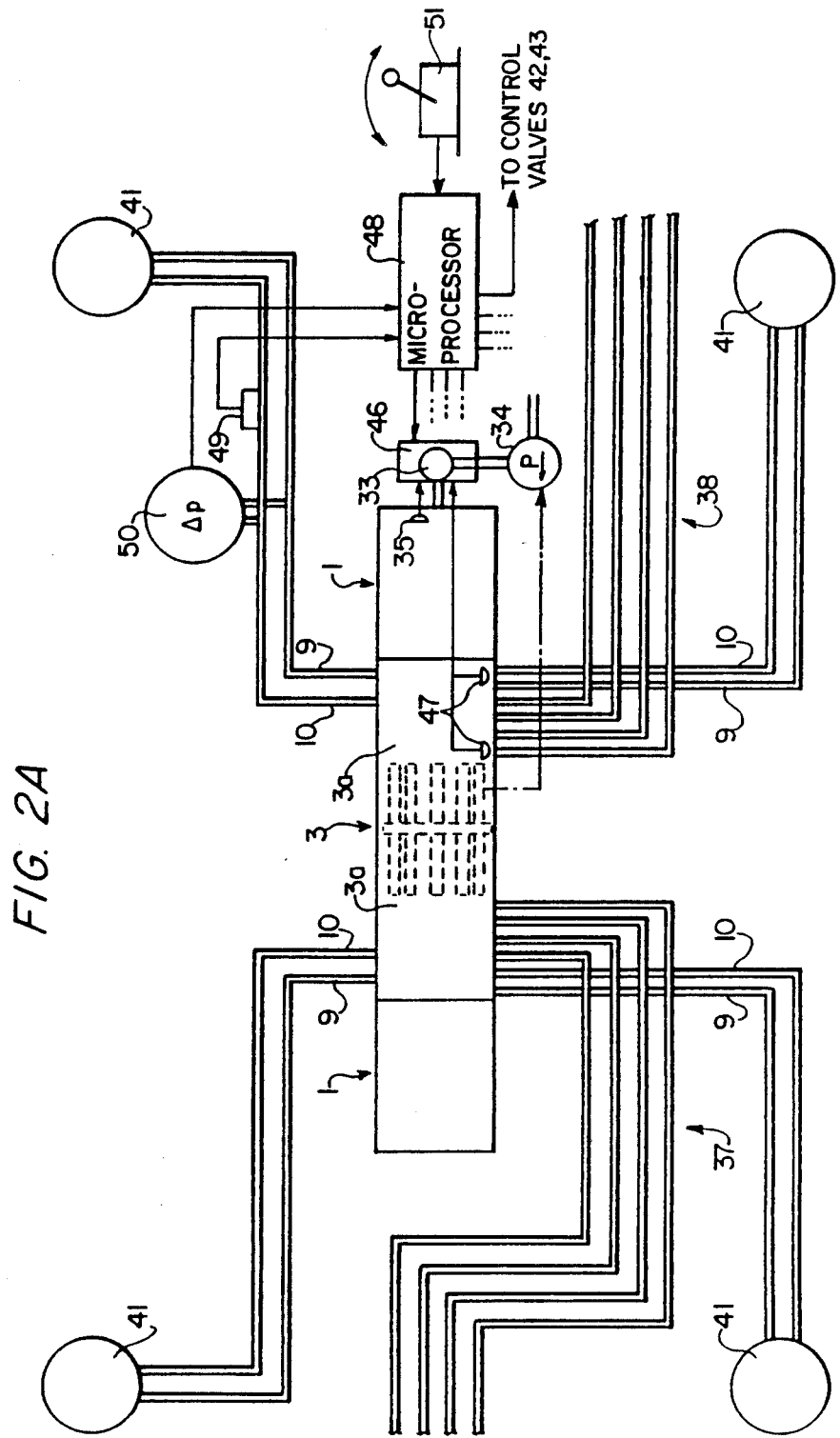
FIG. 2A is a diagrammatic view of a first embodiment of an application of the power aggregate of FIG. 1.
Figure 5:
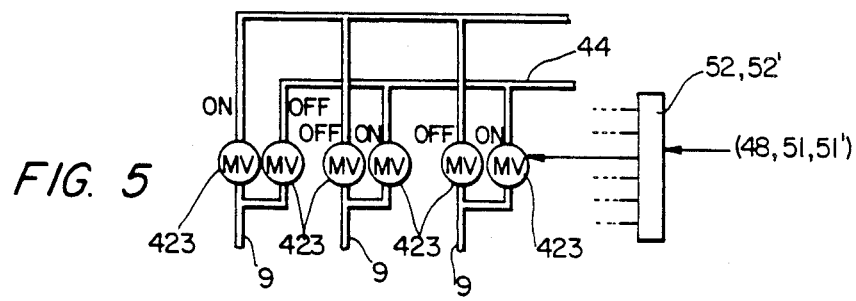
FIG. 5 is a diagrammatic view showing separate magnetic control valves, for use in the power aggregate of FIG. 1.
Figure 6:
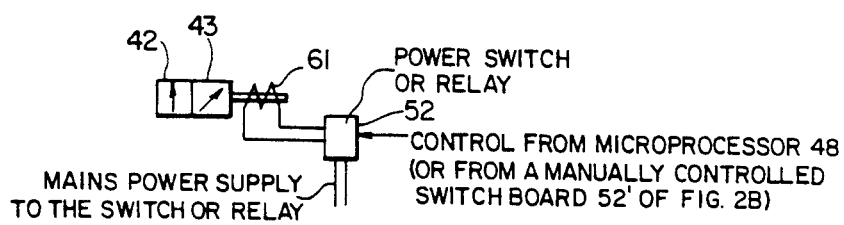
FIG. 6 is a diagrammatic view showing electrical control of the magnetic control valves of the power aggregate of FIG. 1.

These problems can be avoided by utilizing separate ON/OFF magnetic valves 423, as shown in FIG. 5. The different ON and OFF combinations between the lines on each side of the valve set can be selected by electrical control of valves 423. In the case of magnetic valves, the valves 423 are physically separated, and are either manually controlled, for example by rocker arms 60 as shown in FIG. 3, or electrically controlled by solenoids 61 as shown in FIG. 6. In the case where the valves are electrically controlled, the solenoids 61 have their power switch or relay 52 controlled by a microprocessor 48 through a common control panel or unit 46, as shown in FIGS. 2A and 6. All valves 42 and 43 of the valve set for one motor 41 thus have common simultaneous control for selecting the different combinations of the pump cylinders 5.

The different combinations of the on and off positions of the separate valves 42 and 43 can be controlled either manually or automatically, or by a combination of manual and automatic controls. The input signals of microprocessor 48 determine whether the control is manual, automatic, or a combination thereof. In a preferred embodiment, the control is a combination of manual and automatic, as shown in FIGS. 2A and 2B. For example, the desired speed can be set by a manual control 51 (FIG. 2A) or 51' (FIG. 2B). In order to prevent the speed from varying from the set desired speed when going uphill or downhill, microprocessor 48 (FIG. 2A) or 48' (FIG. 2B) receives its control information from the instantaneous pressure difference 50 and flow rate 49 in delivery and intake ducts 9 and 10. On the basis of this combined information, microprocessor 48 or 48' calculates both the required engine power and the required hydraulic fluid flow rate. The engine power is controlled by controlling the timing, especially the total time of the fuel injection. The hydraulic fluid flow rate is controlled by controlling valves 42 and 43 as previously set forth.

The embodiments shown in FIGS. 2A and 2B are alternatives. As shown in FIG. 2A, microprocessor 48 receives all the control signals which indicate both the desired power output, from manual control 51, and the real power output from instantaneous pressure difference 50 and flow rate 49. Microprocessor 48 also delivers all the control signals which control both the fuel injection (engine power) and valves 42 and 43 (power transmission) through power switch or relay 52 (FIGS. 5 and 6). In the embodiment of FIG. 2A, manual control 51, microprocessor 48, and power switch or relay 52 function as control means for controlling the different combinations of the on and off positions of the separate valves 42 and 43.

As shown in FIG. 2B, microprocessor 48' receives only the control signals which indicate the real power output from instantaneous pressure difference 50 and flow rate 49, and it delivers only the control signals for controlling the fuel injection (engine power). The control of engine power and the control of valves 42 and 43 are separated from each other. Also, the engine power is controlled automatically such that the operating frequency of the engine is maintained substantially constant independent of the load variations. For this purpose, microprocessor 48' receives information of the load and of the engine frequency.

A pair of piston rod position sensors 47 can be used as combined position and frequency sensors which provide the position and frequency information to microprocessor 48'. The power output through valves 42 and 43 can be manually controlled directly by manual control or control lever 51', which has, for example, positions 0 to 7 for selecting through a switchboard 52' the corresponding valve combinations. One control lever 51' can be used to control one or more hydraulic motors 41. In the embodiment of FIG. 2B, control lever 51' and switchboard 52' function as control means for controlling the different combinations of the on and off positions of the separate valves 42 and 43.

Referring again to FIG. 1, the piston rod position sensors 47 and/or pressure sensor 35 are coupled to the control unit 46, and send a control signal to the control unit 46. The main function of control unit 46 is a delay function, specifically delaying the timing of the ON and OFF control of magnetic switching valve 33. In addition to timers 461 and 462 for accomplishing the delay function, control unit 46 also includes electric power components 463 for the ON and OFF control of switching valve 33, and can also include an input and processing unit 460 for inputting and processing information directly from the position and/or pressure sensors 47 and 35 in order to control timers 461 and 462 such that the operating frequency of the engine remains constant. The cycle of the operating frequency can be measured (sensed) directly by the two position sensors 47 connected to a cycle duration detector 464. Alternatively, the setting of timers 461 and 462 can be controlled by direct manual control in order to manually control the engine power; but in this case, the operating frequency of the engine varies as conventionally with the prior art internal combustion engines.

When microprocessor 48 is included in the control means of the engine power, control unit 46 can be reduced to include only delay timers 461 and 462 and the ON/OFF power control 463 of switching valve 33 under the control of delay timers 461 and 462. In a preferred embodiment, the first delay timer 461 sets the time between the signal from position sensor 47 and the opening of switching valve 33, and the second delay timer 462 sets the time between the opening and closing of switching valve 33.

Pressure sensor 35 can be used to prevent the opening of switching valve 33 in the case of inadequate or excessive pressure. As shown in FIG. 1, sensor 35 directly controls the solenoid of valve 33, as indicated by the arrow leading from sensor 35 to valve 33. Alternatively, as shown in FIG. 2A, the solenoid of valve 33 is controlled by control unit 46 in combination with position sensor 47. The position sensor 47 is necessary, but the pressure sensor 35 is and optional feature and is not necessary.

For the production of electricity, the piston rod 6 is fitted with a magnet 22 which, as the motor is running, travels back and forth past the poles of an iron core 23 of a winding 24. The winding 24, together with its iron core 23, is fastened to the annular body member 27a. The drawing shows a skeleton example. In practice, the magnet 22 and iron core 23 can have several poles both axially one after the other and laterally side by side. The hydraulic pump 3 is the main power source and the electric generator section indicated by reference numeral 21 is an auxiliary power source, used for charging the battery of a working machine. Electric generator 21 can also be used as an engine starting motor. In this case, its output must be designed to be sufficient for setting the engine pistons in a reciprocating motion whose stroke gradually increases sufficiently to produce in either engine cylinder a pressure required for the ignition of fuel.

Several applications also require compressed air. This is provided by a pneumatic compressor 25 whose piston 26 is concentrically fixed to piston rod 6 inside cylinder 27. Both ends of cylinder 27 are provided with intake air ducts 29 fitted with back-pressure valves 28 and compressed air ducts 30 fitted with back-pressure valves 31, said piston 26 effecting an expansion stroke in both directions.

In FIG. 2 is shown an example for applying a power aggregate of the invention to a working machine, comprising four (4) drive motors 41, carried by the wheel hubs (not shown) and each separately connected through its own delivery and intake and ducts 9 and 10 to the power aggregate pump section 3. Such arrangement is suitable for all four-wheel drive vehicles, such as automobiles. In working machine applications, from both cylinder units 3a of pump section 3 extend a plurality of pressure and return conduits 37 and 38 which are connected to the operating cylinder of a working machine as well as to the cylinders and/or motors of working equipment. Examples of such working machine applications include chassis-controlled maintenance machines and farming machines.

The pump section 3 includes at least four equal-sized piston-cylinder units 4, 5 for operating drive motors 41. In addition to these, there will be a number of piston-cylinder units 4, 5 required by the working equipment. In view of the power control, it is preferable if there are several piston-cylinder units 4, 5 for a single drive motor or working tool.

The operation of a power aggregate proceeds as follows. The start-up is effected, e.g. electrically, by means of generator unit 21. The start-up can also be effected from a compressed-air accumulator by means of compressor element 25 or from a hydraulic fluid pressure accumulator through the intermediary of hydraulic pump section 3. If the engine operates on a two-stroke diesel principle, the start-up can be facilitated by using a glow plug. Fuel injection pumps or nozzles 32 can be coupled to receive their operating power from piston rod 6 (principally the same way as hydraulic piston-cylinder units 4, 5). Alternatively, it is possible to employ electrically-operated or electrically-controlled injection pumps or nozzles 32. An essential feature is that injection pumps or nozzles 32 receive their operation timing on the basis of the position of engine piston 2 or on the basis of the pressure prevailing in cylinder 14 or on the basis of the combined effect of these two.

FIG. 1 shows a high-pressure pump 34 for supplying fuel to fuel injection nozzle 32 by way of a magnetic valve 33. The opening and closing of valve 33 is controlled by a position sensor 47 through a control unit 46. The opening of valve 33 can also be controlled by a pressure sensor 35 of cylinder 14. A pressure accumulator 36 equalizes the liquid fuel supply pressure. Valve 33 shuts off after a certain delay time. The engine output can be controlled by adjusting the delay time, i.e. the duration of injection period. For optimizing the engine output, it is advantageous that opening and/or closing of valve 33 is controlled (delayed) such that the operating frequency of the engine is maintained substantially constant independently of the load variations.

As shown in FIG. 2, the dashed line L between hydraulic pump 3 and high-pressure pump 34 indicates that the fuel to be injected into high-pressure pump 34 can be pressurized by the pressure created by hydraulic pump 3.

Engine start-up can be effected by using a relatively low compression for the ignition of fuel provided that a glow plug is utilized. The first expansion stroke already creates a substantially higher compression in the opposite engine cylinder 14 with a more effective explosion therein and compression increases again in the opposite cylinder 14. Since the operation proceeds on a two-stroke principle, compressor 15 has an essential significance for the engine output. Since the diameter of a compressor cylinder 16 exceeds that of engine cylinder 14, the amount of scavenging air will be sufficient for the effective exhaustion of combustion gases. This ensures that the power aggregate produces a high output with respect to its size. The timing of liquid fuel injection has a particular significance in connection with a compressor-effected scavenging. Thus, the entire combustion chamber can be completely scavenged before the liquid fuel is supplied into the cylinder. In other words, the injection of liquid fuel into cylinder 14 is not effected until all ports of cylinder 14 are shut off.

If, e.g. due to a disturbance in liquid fuel supply, there is no ignition in one engine cylinder 14, the air in that cylinder compresses and stops piston 2 before it hits the cylinder cover. Since the compression in this situation does not exceed the normal expansion stroke pressure, the engine will not be damaged as a result of this disturbance or malfunction.

As far as the invention is concerned, a diesel principle is obviously preferred, also for the reason that then, the moment of ignition will be automatically optimally adjusted and the timing of the ignition need not be separately taken care of by special mechanical or electronic equipment. It is self-evident, however, that an Otto-cycle engine with electric ignition as well as valve engines and four-stroke engines also lie within the scope of the invention.

As the power aggregate is running, one or a plurality of hydraulic piston-cylinder units 4, 5 provide hydraulic fluid for their own motor or cylinder whose operation can thus be controlled separately and independently. The control can be effected e.g. by regulating the intake pressure of pump cylinders 5 by adjusting the opening degree of the back-pressure valve 9a fitted in the delivery duct 9. This creates a negative pressure in the pump cylinder and the cylinder is only partly filled with oil. It is also possible to employ other per se known valve solutions, such as a valvistor or other proportional valves in the pressure ducts.

A particularly preferred situation is accomplished by combining in a common delivery duct 9 two pump cylinders 5 provided in different annular members 3a for double pulse frequency and lower pulse amplitude. In this case, a pressure accumulator is not always required, but the inherent volume and flexibility of hydraulic hoses serves as a pressure accumulator for equalizing the pressure delivered to the engine. However, the use of hydraulic pressure accumulators offers many useful extra properties, such as possible hydraulic engine start-up or storage of vehicle braking energy. The braking energy stored in a pressure accumulator can be exploited in a per se known manner for acceleration at the time of take-off. A third application of pressure accumulators can be the control of the engine stroke frequency by means of hydraulic counterpressure without any loss of power.

The above embodiments have not been described in view of limiting the invention in any way. A detailed construction may be varied in many ways. For example, the engine pistons 2 can be combined with each other in many different ways to operate in alternating strokes. Pistons 2 can be parallel and their piston rods can be journalled to the ends of a rocker arm. The engine can also be designed to operate in a manner that the engine pistons are not mechanically linked together but adapted to travel more or less independently of each other. In this case, a reverse stroke (scavenging and compression) is effected by means of springs. Naturally, the invention also covers a solution in which a plurality of engine units are connected in parallel to provide a single power aggregate. The scope of the invention also covers those applications in which a intake duct 10 coming out of a single pump cylinder 5 forks for two or more drive motors or actuators provided, however, that a multi-piston principle of the invention is simultaneously utilized for hydraulic power output within the scope of the annexed claims.

What is claimed is:

1. A power aggregate comprising:
   a body;
   an internal combustion engine having at least one engine cylinder mounted on said body;
   a fuel injection nozzle fluid connected to said engine cylinder;
   magnetic valve means for regulating the flow of fuel through said fuel injection nozzle into said engine cylinder;
   sensor means for sending a control signal to said magnetic valve means for preventing said magnetic valve means from opening in case of inadequate or excessive pressure;
   control means for delaying the timing of the switching ON and OFF of said magnetic valve means relative to the sending of the control signal from said sensor means;
   a reciprocating engine piston in said engine cylinder;
   a piston rod fastened to said engine piston, whereby said piston rod reciprocates in association with said engine piston; and
   a power output unit comprising at least three pump cylinders and at least three pump pistons fixed to said piston rod at a radial distance from said piston rod, each of said pump cylinders having a corresponding pump piston reciprocating therein and each of said pump cylinders and its corresponding pump piston forming a unit, and at least three fluid intake ducts and at least three pressure ducts, each of said pump cylinders having a hydraulic fluid intake duct and a pressure duct, said intake ducts and said pressure ducts connecting said pump cylinders to a drive motor or an actuator cylinder, at least two of said pump cylinders having different diameters, and said pressure ducts of said at least two pump cylinders each having control valve means for separately controlling the outputs of said at least two pump cylinders.

2. The power aggregate of claim 1, said engine piston having a base, said engine cylinder being provided with a pressure sensor, and said engine comprising a two-stroke engine equipped with a compressor comprising:
- at least one compressor cylinder disposed as an axial extension of said engine cylinder;
- a compressor piston fitted in each said at least one compressor cylinder and fixed to said base of said engine piston; and
- an intake air duct connected to each said compressor cylinder and fitted with a back-pressure valve and a scavenging air duct connecting each said compressor cylinder to said engine cylinder; and
- said power aggregate further comprising fuel injection valve means for injecting fuel into said engine, said pressure sensor being coupled to said fuel injection valve means.

3. The power aggregate of claim 1, at least two units of said pump pistons and said pump cylinders being connected in direct fluid communication with a single drive motor or a single actuator cylinder, each of said at least two units having circulation valve means for allowing free circulation of the hydraulic fluid.

4. A power aggregate comprising:
- a body;
- an internal combustion engine having at least one engine cylinder mounted on said body;
- a fuel injection nozzle fluid connected to said engine cylinder;
- a reciprocating engine piston in said engine cylinder;
- a piston rod fastened to said engine piston, whereby said piston rod reciprocates in association with said engine piston;
- magnetic valve means for regulating the flow of fuel through said fuel injection nozzle into said engine cylinder;
- piston rod position sensor means for sending a control signal to said magnetic valve means for switching ON and OFF of said magnetic valve means;
- control means for delaying the timing of the switching ON and OFF of said magnetic valve means relative to the sending of the control signal from said sensor means; and
- a power output unit comprising at least three pump cylinders and at least three pump pistons fixed to said piston rod at a radial distance from said piston rod, each of said pump cylinders having a corresponding pump piston reciprocating therein and each of said pump cylinders and its corresponding pump piston forming a unit, and at least three fluid intake ducts and at least three pressure ducts, each of said pump cylinders having a hydraulic fluid intake duct and a pressure duct, said intake ducts and said pressure ducts connecting said pump cylinders to a drive motor or an actuator cylinder, at least two of said pump cylinders having different diameters, and said pressure ducts of said at least two pump cylinders each having control valve means for separately controlling the outputs of said at least two pump cylinders.

5. The power aggregate of claim 4, at least two units of said pump pistons and said pump cylinders being connected in direct fluid communication with a single drive motor or a single actuator cylinder, each of said at least two units having circulation valve means for allowing free circulation of the hydraulic fluid.

6. The power aggregate of claim 4, further comprising delay means connected between said piston rod position sensor means and said magnetic valve means for delaying the switching ON and OFF of said magnetic valve means.

7. The power aggregate of claim 6, further comprising control means for controlling the delay times of said delay means for maintaining the operating frequency of the engine substantially constant independent of load variations.

* * * * *